US009578701B1

(12) United States Patent
Logiudice et al.

(10) Patent No.: US 9,578,701 B1
(45) Date of Patent: Feb. 21, 2017

(54) SWITCHED CAPACITOR LED MATRIX DRIVER

(71) Applicant: Infineon Technologies AG, Neubiberg (DE)

(72) Inventors: Andrea Logiudice, Padua (IT); Maurizio Galvano, Padua (IT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/153,407

(22) Filed: May 12, 2016

(51) Int. Cl.
  *H05B 33/08* (2006.01)
  *H05B 37/02* (2006.01)
  *B60Q 1/04* (2006.01)

(52) U.S. Cl.
  CPC ............. *H05B 33/0815* (2013.01); *B60Q 1/04* (2013.01); *H05B 33/0857* (2013.01); *H05B 37/0218* (2013.01)

(58) Field of Classification Search
  CPC ............ H05B 33/0812; H05B 33/0818; Y02B 20/347; H02M 1/4258
  USPC .... 315/185 R, 188, 247, 291, 294, 307, 312
  See application file for complete search history.

(56) References Cited

U.S. PATENT DOCUMENTS

| | | | |
|---|---|---|---|
| 6,864,641 B2 | 3/2005 | Dygert | |
| 7,919,936 B2* | 4/2011 | Liu | H05B 33/0827 315/185 R |
| 8,686,650 B2* | 4/2014 | Shimura | H05B 33/0827 315/185 R |
| 2009/0187925 A1* | 7/2009 | Hu | H05B 33/0815 719/327 |
| 2016/0234895 A1* | 8/2016 | Delos Ayllon | H05B 33/0815 |
| 2016/0242243 A1* | 8/2016 | Delos Ayllon | H05B 33/0806 |

OTHER PUBLICATIONS

Ma et al., "Chapter 5: Reconfigurable Switched-Capacitator Power Converters,"Springer, 2013, 182 pp. (Applicant points out, in accordance with MPEP 609.04(a), that the year of publication, 2013, is sufficiently earlier than the effective U.S. filing date, May 12, 2016, so that the particular month of publication is not in issue.)

* cited by examiner

*Primary Examiner* — Haissa Philogene
(74) *Attorney, Agent, or Firm* — Shumaker & Sieffert, P.A.

(57) ABSTRACT

This disclosure is directed to techniques for efficiently driving multiple light emitting diode (LED) strings from a single regulated source. The techniques of this disclosure may utilize a switched capacitor DC-to-DC converter between the regulated source and the LED string. The switched capacitor (SC) converter may have multiple gain levels to efficiently match the drive voltage from the regulated source to the LED string voltage for each particular LED string. In some examples, the SC converter may have multiple gain levels such that the SC converter may deliver an LED string voltage that is approximately a multiple of the number of LEDs in the LED string. Using capacitor components in an SC converter may have the advantages of small size and low cost.

20 Claims, 9 Drawing Sheets

FIG. 4A CHARGING

FIG. 4B DISCHARGING

FIG. 4C CHARGING

FIG. 4D DISCHARGING

FIG. 4E CHARGING

FIG. 4F DISCHARGING

SWITCHED CAPACITOR LED MATRIX DRIVER

TECHNICAL FIELD

The disclosure relates to light emitting diode (LED) driver circuits.

BACKGROUND

Devices and systems that use light emitting diodes (LEDs) may arrange the LEDs in strings. Some examples may include displays, computer monitors, automobile lighting and similar devices. To allow correct LED operation, a current or voltage regulator may provide power to more than one LED string. When the LED strings each have the same forward voltage drop, e.g. the LED strings may have the same number of LEDs on each string, a single voltage regulator may efficiently power multiple strings. However, efficiency can dramatically decrease for small forward voltages differences between different LED strings. Some techniques to efficiently drive different LED strings with different forward voltages may be bulky, expensive or both.

SUMMARY

In general, the disclosure directed to techniques for efficiently driving multiple light emitting diode (LED) strings from a single regulated source. The techniques of this disclosure may utilize a switched capacitor DC-to-DC converter between the regulated source and the LED string.

In one example, the disclosure is directed to a method comprising: determining, by a light-emitting diode (LED) matrix driver system, a maximum LED string voltage associated with at least one LED string of a plurality of LED strings; and in response to determining the maximum LED string voltage, adjusting, by the LED matrix driver system, an output voltage of a regulator output, wherein: the regulator output couples to a plurality of input terminals of a plurality of switched capacitor (SC) converters, and a respective SC converter of the plurality of SC converters delivers a respective LED string voltage to drive an LED string of the plurality of LED strings, wherein the respective LED string voltage is less than or equal to the maximum LED string voltage.

In another example, the disclosure is directed to a system comprising: a plurality of LED strings, wherein each LED string in the plurality of LED strings includes a plurality of LEDs, and one of the plurality of LED strings defines a maximum LED string voltage; a plurality of switched capacitor (SC) converters, wherein each respective SC converter of the plurality of SC converters includes an input terminal and an output terminal, and wherein the output terminal of a respective SC converter couples to a respective LED string of the plurality of LED strings and provides a respective LED string voltage to drive each respective LED string; and a voltage regulator, wherein a voltage regulator output couples to each input terminal of the plurality of SC converters, and the system adjusts an output voltage of the voltage regulator based at least in part on the maximum LED string voltage.

In another example, the disclosure is directed to a device comprising: a plurality of LED strings, wherein each LED string in the plurality of LED strings includes a plurality of LEDs, and one of the plurality of LED strings defines a maximum LED string voltage; a plurality of switched capacitor (SC) converters, wherein each respective SC converter of the plurality of SC converters includes an input terminal and an output terminal, and wherein the output terminal of a respective SC converter couples to a respective LED string of the plurality of LED strings and provides a respective LED string voltage to drive each respective LED string; and a voltage regulator, wherein a voltage regulator output couples to each input terminal of the plurality of SC converters, and the system adjusts an output voltage of the voltage regulator based at least in part on the maximum LED string voltage.

The details of one or more examples of the disclosure are set forth in the accompanying drawings and the description below. Other features, objects, and advantages of the disclosure will be apparent from the description and drawings, and from the claims.

DETAILED DESCRIPTION

This disclosure is directed to techniques for efficiently driving multiple light emitting diode (LED) strings from a single regulated source. The techniques of this disclosure may utilize a switched capacitor DC-to-DC converter between the regulated source and the LED string. The switched capacitor (SC) converter may have multiple gain levels to efficiently match the drive voltage from the regulated source to each respective LED string. In some examples, the SC converter may have gain levels such that the SC converter can deliver an LED string voltage that is an approximate multiple of the number of LEDs in the LED string. With the correct gain, Gi, the ideal efficiency of the SC converter can reach 100%. In an example, an LED driver system may include a controller that may set the number of active LEDs in an LED string. An "active" LED may be an LED that is has electric current flowing through the LED and is using power. The controller may set the SC converter gain for a respective LED string based on the number of active LEDs in that LED string.

When driving different LED chains with different number of LEDs or different LED string voltages from a single regulated source, the efficiency of the system power conversion from the battery to the different LED strings decreases dramatically for small differences in LED string voltage compared to voltage output of the single regulated source. For example, a matrix LED driver or dynamic headroom control technique may be well suited for a matrix of LED strings of the same forward voltage. As soon the LED strings have different voltages, the power dissipation of the current source with the highest drop may cause severe efficiency losses. A DC-to-DC converter for each LED string may allow efficient operation though each LED string may have a different forward voltage than other LED strings driven by the same regulated source.

Another technique to efficiently drive a matrix or series of LED strings may be to include a switching inductor buck converter in each LED string. The buck converter may track the number of active LEDs in an LED string and match the LED string voltage to the number of active LEDs in the LED string. The inductive buck converter may match the voltage specifically for that LED string. Since switching inductor buck converters may be very efficient, the overall system may have a high efficiency even if each LED string has a different LED string voltage from the other LED strings. The efficiency of an inductive buck converter may improve at high duty cycles because the closer the main voltage regulator output voltage comes to the forward voltage of the highest LED string, the higher the duty cycle, the higher the efficiency. However, each inductive buck DC-to-DC power converter may require a power inductor, which are expensive, bulky, and a source of radiated emissions that may cause electromagnetic interference (EMI). Because each LED string may require an inductive buck power converter, then each string requires an expensive and bulky inductor. In contrast, discrete capacitor components, as used in an SC converter, are very small, inexpensive and do not have the EMI potential of an inductor. By using an SC converter in each string, a system may achieve advantages of low cost and small size relative to systems that use an inductive buck power converter for each string. An SC converter configured so the gain is a multiple of the number of LEDs in an LED string may significantly reduce complexity when compared to other options. Also, depending on the power requirements for the LED strings, a SC converter may be fabricated on an integrated circuit.

Figure 1A:
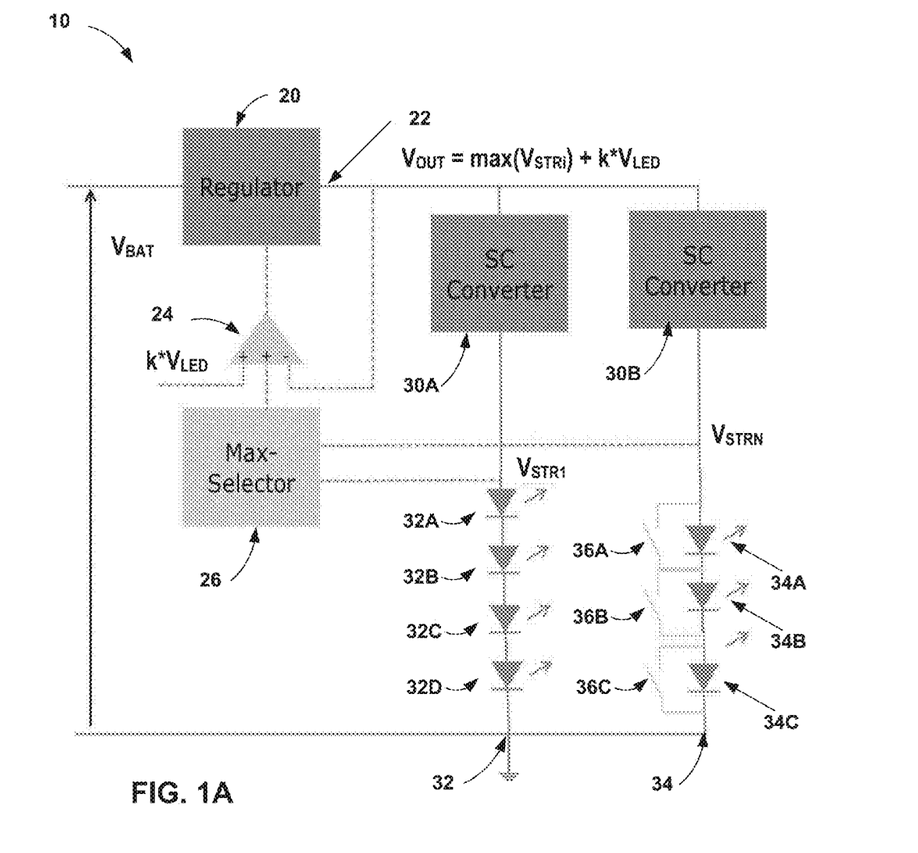
FIG. 1A is a conceptual and schematic block diagram illustrating an example LED matrix driver system using switched capacitor converters.

FIG. 1A is a conceptual and schematic block diagram illustrating an example LED matrix driver system using switched capacitor converters. FIG 1A depicts LED matrix driver system 10 (simply called system 10), which may include one or more LED strings driven by a power supply and controlled by various electrical components. Examples uses of system 10 may include vehicle lighting, display lighting, room or structure lighting and other uses. For example, an automobile may include LED strings as part of the headlights, turn signals, taillights or interior lighting.

The example of system 10 shown in FIG. 1A may include voltage regulator 20, one or more switched capacitor (SC) DC-to-DC converters 30A-30B, a summing amplifier 24, max-selector 26, and one or more LED strings 32 and 34 controlled by switches 36. Voltage regulator 20 may include output 22 that couples to the input terminals of each respective SC converter 30A and 30B as well as an inverting input of summing amplifier 24. Summing amplifier 24 may also receive an output from max-selector 26 and a voltage equal to a multiple of each LED voltage drop ($V_{LED}$). Each respective SC converter may deliver an LED string voltage that may be different depending on each respective LED string. For example, SC converter 30B may deliver an LED string voltage to LED string 34 that has a different value than the LED string voltage output from SC converter 30A to LED string 32. In the example of FIG. 1A, the supply voltage is $V_{BAT}$, which connects between ground and regulator 20. In other examples, the supply voltage may come from a battery or any similar power source.

The output of voltage regulator 20 may be set, for example, to a multiple of the number of LED forward voltages or may be set to the maximum LED string voltage present in the system. The maximum LED string voltage may be the highest voltage required to properly operate a respective LED string. Regulator 20 may supply electrical power at a regulated voltage through output 22 to each input terminal of the one or more SC converters 30A-30B. The value of output of voltage regulator 20, $V_{OUT}$, may also be called the "intermediate voltage" because it is a value between $V_{BAT}$ and the LED string voltage $V_{STRi}$.

LED strings 32 and 34 may include a plurality of LEDs (32A-32D and 34A-34C). The example of FIG. 1A depicts system 10 with two LED strings, however an LED matrix driver system may have any number of LED strings. Each LED may be controlled by a switch 36A-36C. When a switch is open, the associated LED may be an active LED. For example, if switch 36A is open, this allows current to flow through LED 34A. Therefore, 34A may be an active LED that emits light. A closed switch 36A may allow current to bypass LED 34A and LED 34 will no longer be an active LED and no longer consume power or emit light. An LED in an LED string of example system 10 may emit light in a range of frequencies, such as white, blue, infrared or other frequencies and colors. An LED may be configured to emit a single color or more than one color.

An LED may have a voltage drop ($V_{LED}$). The terms voltage drop, forward voltage and forward voltage drop may be used interchangeably throughout this disclosure. The LEDs in an LED string may all have the same voltage drop or each may have a different voltage drop. For example, the voltage drop for LED 32A may be approximately the same as the voltage drop for LED 32D, that is $$V_{LED-32A} \approx V_{LED-32D}.$$

LEDs may have approximately the same voltage drop whether each LED is of the same type or different types from each other. Manufacturing variations, differences in raw materials or assembly processes may cause LEDs of the same type to have small differences in $V_{LED}$, yet still be considered approximately equal to each other.

In examples where the LED voltage drop is approximately equal for each LED in an LED string, system 10 may determine an LED string voltage ($V_{STRi}$) by multiplying the number of active LEDs by the LED voltage drop. For example, in LED string 34, assume switches 36A and 36C are open, while switch 36B is closed. Therefore, LEDs 34A and 34C are active LEDs. System 10 may determine that the LED string voltage for LED string 34 according to the following equation:

$$V_{STRi} = 2 * V_{LED}.$$

System 10 may similarly determine the LED string voltage for any of the one or LED strings in system 10. In examples where the LED voltage drop $V_{LED}$ for each LED in an LED string are not approximately equal, then system 10 may individually sum the LED voltage drop for each LED in an LED string to determine the LED string voltage $V_{STRi}$.

Max selector 26 determines which of the one or more LED strings requires the highest minimum voltage for proper operation and outputs this highest minimum voltage. In the example of FIG. 1A, LED string 32 includes four LEDs while LED string 34 includes up to three LEDs. If we assume all LEDs in each string are active LEDs and all have the same voltage drop ($V_{LED}$) then for LED string 32, the LED string voltage ($V_{STR1}$) will be need to be greater than the LED string voltage ($V_{STRN}$) for LED string 34. Therefore, LED string 32 is the LED string with the maximum LED string voltage max ($V_{STRi}$) for example system 10. Max-selector 26 may determine that LED string 32 requires the maximum string voltage max ($V_{STRi}$)=$V_{STR1}$, and transmit this information to regulator 20 through summing amplifier 24. This may cause regulator 20 to output at least max ($V_{STRi}$) to ensure enough headroom for all current sources, SC converters 30A-30B, to work properly.

Summing amplifier 24 may receive inputs from max-selector 26, feedback from regulator output 22 and additional system input k*$V_{LED}$. The additional system input may include a factor to allow additional headroom for all current sources to work properly. Additional may include an LED voltage drop $V_{LED}$ multiplied by an additional voltage factor k, where k is an integer. The intermediate voltage output from regulator 20 may conform to the equation $$V_{OUT} = \max(V_{STRi}) + k*V_{LED}.$$

For maximum system efficiency, the regulator 20 voltage $V_{OUT}$ should be the minimum possible voltage that allows the SC converters 30A-30B to deliver the correct LED string voltage ($V_{STRi}$) to operate each LED string properly. System efficiency will be discussed in more detail below for FIG. 1B. In some examples the additional voltage factor may be zero (k=0).

Each LED string in system 10 may have a switched capacitor (SC) DC-to-DC converter 30A-30B. The SC converter for each string may deliver the LED string voltage $V_{STRi}$ to properly operate the LED string. The SC converter may deliver an LED string voltage, based at least in part on the number of active LEDs in an LED string. For example, for LED string 32, if we assume all LEDs are active and each LED has the same forward voltage $V_{LED}$, then the LED string voltage $V_{STR1}=4*V_{LED}$. By providing no more than the LED string voltage required to properly operate the active LEDs, the SC converter may achieve the best efficiency. Also, by ensuring the output voltage of the voltage regulator $V_{OUT}$ is as small as possible while still ensuring enough headroom for all SC converters to work properly system 10 may achieve the maximum system efficiency. In other examples, the SC converter may regulate the SC converter output current, e.g. $I_{STRi}$ to ensure proper string operation.

Example DC-to-DC SC converter 30B includes an input and an output. The input for SC converter 30B is the output 22 of regulator 20 ($V_{OUT}$). The output for SC converter 30B is the LED string voltage $V_{STRN}$ for LED string 34. The gain of SC converter 30B may be shown according to the following:

$$G_{30B} = \frac{V_{STRN}}{V_{OUT}}$$

In general, for any SC converter, the maximum efficiency may be shown according to:

$$Eff_{MAX} = \frac{V_{STRi}}{V_{OUT}*Gi}$$

Now set $V_{OUT}=k*V_{LED}+\max(V_{LED})$, as shown in FIG. 1, then the maximum efficiency can be written as:

$$Eff_{\_MAXi} = \frac{V_{LEDi}}{(k*V_{LED} + \max(V_{LED}))*Gi}$$

Assuming all LEDs in system 10 have approximately the same forward voltage $V_{LED}$ and $\max(V_{STRi})$ is the highest LED string voltage $V_{STRi}$ of system 10, then the equation can be simplified by replacing $V_{STRi}$ and $\max(V_{STRi})$ with:

$V_{STRi}=n*V_{LED}$,
$\max(V_{STRi})=m*V_{LED}$, where
n=the number of active LEDs in a respective LED string,
m=the number of active LEDs in the LED string with the maximum LED string voltage, and
(k+m)=is the gain factor for the maximum string voltage for any given string $V_{STR1i}$, the equation becomes:

$$Eff_{\_MAXi} = \frac{n*V_{LED}}{(k*V_{LED} + m*V_{LED})*Gi} = \frac{n}{(k+m)*Gi}$$

Therefore, using an SC converter with Gi according to the below equation may achieve a theoretical maximum efficiency of 100%:

$$Gi = \frac{n}{(k+m)}$$

Some examples of system 10 may implement an SC converter gain according to the equation above by using an SC converter configured as a multi-gain SC converter in which the gain is a fraction of two integers. The intermediate voltage $V_{OUT}$ of regulator 20 may be configured to be a multiple of the LED forward-voltage $V_{LED}$. Therefore, the system may select a gain Gi for a respective SC converter that may output from the SC converter an LED string voltage $V_{STRi}$ that is a fractional value of regulator voltage $V_{OUT}$.

For example, in system 10, assume $V_{STR1}=4*V_{LED}$ and $V_{STRN}=3*V_{LED}$ and k=0. The output of regulator 20 may be configured to be:

$$\max(V_{STRi})=m*V_{LED}=4*V_{LED}=V_{OUT}.$$

and set the gains, Gi, of the SC converters to:

$$G_{30A}=1, \text{ while } G_{30B}=\tfrac{3}{4}.$$

In this case the maximum efficiency of each respective SC converter can be written as:

$$EFF_{\_SC\_MAX\_30A} = \frac{4*V_{LED}}{4*V_{LED}*1} = 1$$

$$EFF_{\_SC\_MAX\_30B} = \frac{3*V_{LED}}{4*V_{LED}*3/4} = 1$$

The efficiency of system 10 depends therefore on the efficiency of regulator 20, which can be configured to be close to 100% by using, for example, a switching inductor converter. The maximum efficiency of system 10 may be calculated according to:

$$Eff_{system\_MAX} = Eff_{Regulator} * Eff_{SC_{MAX}} = Eff_{Regulator}$$

because $Eff_{SC_{MAX}} = 1$.

High efficiency may be desirable in such as examples as an all-electric vehicle. In an electric vehicle, high efficiency may minimize battery use and may be an advantage that maximizes the vehicle range. Additionally, using an SC converter for each LED string may deliver advantages over other types of DC-to-DC converters. Switched capacitor converters may be smaller and have lower costs than other types of DC-to-DC converters. The components in an SC converter include capacitors and switches. Using transistors as switches and surface mount technology (SMT) capacitors may offer a low cost and more compact size than, for example a switching inductor converter. For example, the components in a switching inductor converter, though efficient, may include an inductor. Inductors may be significantly larger and more costly than resistors.

Figure 1B:
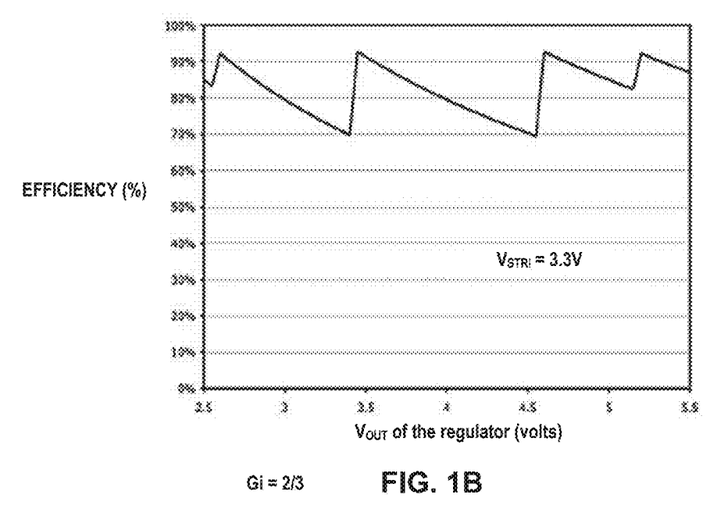
FIG. 1B is a graph showing the efficiency of an SC converter as the input voltage varies.

FIG. 1B is a graph showing the efficiency of an SC converter as the input voltage varies. The example of FIG. 1B illustrates the efficiency of the SC converter, such as 30A or 30B from FIG. 1A. As the input voltage changes, which may be $V_{OUT}$ from regulator 20, the SC regulator efficiency jumps to near 100% when the voltage supplied by the regulator is a multiple of the LED string voltage ($V_{STRi}$) supplied by the SC converter. In other words, the SC converter may have the minimum power loss when the output voltage of the SC converter ($V_{STRi}$) is close to the input voltage ($V_{OUT}$ of regulator) multiplied by the voltage gain Gi of the converter. For example, for SC converter 30A, shown in FIG. 1A, the efficiency of SC converter 30A may increase as $V_{OUT}$ approaches a multiple of $V_{STRN}$. The gain of SC converter 30A is 1(G=1), as described above. In FIG. 1b, the efficiency climbs to near maximum in multiples of one V as shown at near 2.5V, 3.5V and 4.5V.

Figure 1C:
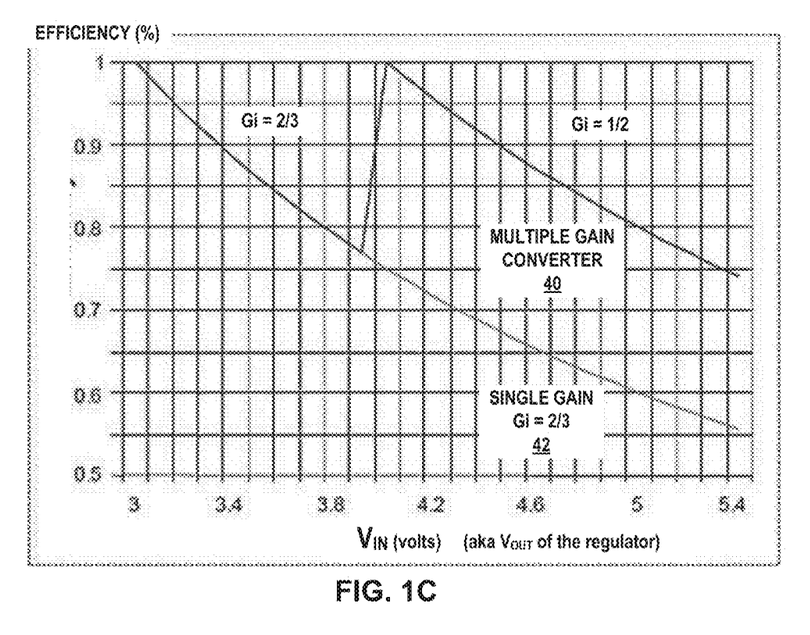
FIG. 1C is a graph illustrating how the efficiency of an SC converter may decrease as the output voltage differs from the input voltage multiplied by the voltage gain.

FIG. 1C is a graph illustrating how the efficiency of an SC converter may decrease as the output voltage differs from the input voltage multiplied by the voltage gain. FIG. 1C includes a graph the efficiency of a single gain SC converter 42 and multiple gain converter 40 as the input voltage to the SC converter increases along the horizontal axis.

FIG. 1C may apply to the example of SC converter 30B shown in FIG. 1A. $V_{IN}$ for SC converter 30B may be $V_{OUT}$ of regulator 20. $V_{OUT}$ for SC converter 30B may be $V_{STRN}$. In this example, LED string 34 may have two of the three LEDs as active LEDs. As shown in FIG. 1C, when $V_{OUT} \approx 3.0V$, the efficiency of SC converter 30B may be near 100%. As $V_{OUT}$ of regulator 20 increases, the efficiency of SC converter 30B decreases significantly. If SC converter 30B were a single gain device (42), the efficiency of SC converter 30 may continue to decrease to near 55% when $V_{OUT}$ of regulator 20=5.4V. However, in examples where SC converter 30B is a multiple gain device, switching the gain from Gi=⅔ to Gi=½ at approximately 3.9V may increase the efficiency to near 100% again. Changing the gain Gi as the input voltage to the SC converter increases may minimize the power loss when the output voltage of the SC converter ($V_{STRi}$) is close to the SC converter input voltage ($V_{OUT}$ of regulator) multiplied by the voltage gain Gi of the SC converter. FIG. 1C shows one advantage of a multiple gain SC converter. Other examples will be discussed in more detail below for FIGS. 3-4.

Figure 2:
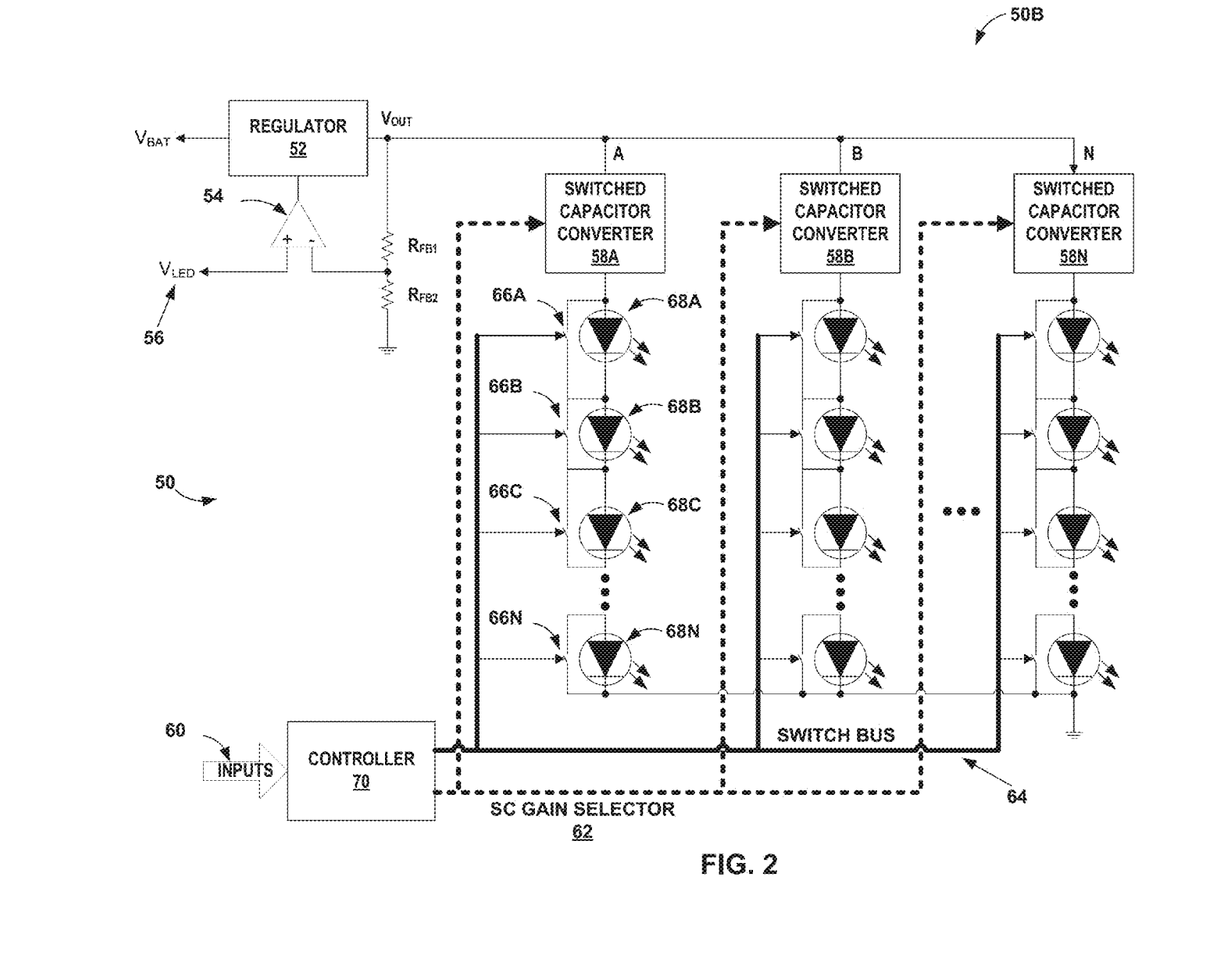
FIG. 2 is a conceptual and schematic block diagram illustrating another example switched capacitor LED matrix driver system, in accordance with the techniques of this disclosure.

FIG. 2 is a conceptual and schematic block diagram illustrating another example switched capacitor LED matrix driver system, in accordance with the techniques of this disclosure. The example LED driver system 50 of FIG. 2 is analogous to system 10 of FIG. 1, but includes additional detail as well as illustrating an example controller 70. In the example of system 50, each LED has the same forward voltage drop $V_{LED}$. Therefore, the LED string voltage $V_{STRi}$ depends on the number of active LEDs in the LED string. However, other example LED driver systems may include LEDs with a variety of values for the forward voltage drop of each LED.

LED matrix driver system 50 may be used in applications as described for system 10 above. Some example applications of a system to drive multiple LED strings include providing a backlight for use in displays as well as other lighting requirements such as security applications to illuminate an area with infrared light for covert image capture with infrared cameras. An efficient LED matrix driver, such as system 50, may be advantageous in applications that rely on battery power because higher efficiency may increase battery life.

System 50 may include voltage regulator 52, summing amplifier 54, SC converters 58A-58N, controller 70 which receives inputs 60 from outside of system 50 and LED strings A-N. LED string A may include LED bypass switches 66A-66N that may cause current to bypass LEDs 68A-68N. For simplicity and clarity, only LED string A has labeled switches and LEDs. Outputs for controller 70 may include SC gain selector 62 and switch bus 64. SC gain selector 62 may transmit a respective gain to each respective SC converter while switch bus 64 may control the LED bypass switches, such as 66A-66N in LED string A.

Voltage regulator 52 may perform the same function as voltage regulator 20 as shown in FIG. 1. The output of regulator 52 may connect to the inputs of multiple SC converters 58A-58N and deliver an intermediate voltage $V_{OUT}$ to ensure SC converters 58A-58N work properly.

Summing amplifier 54 in the example system 50 configures the output $V_{OUT}$ of regulator 52. Summing amplifier 54 may receive inputs such feedback from the output $V_{OUT}$ of regulator 52 and the forward voltage drop for each LED in system 50, $V_{LED}$. In the example of system 50, $V_{OUT}$ feedback comes through a resistor divider with values $R_{FB1}$ and $R_{FB2}$. Summing amplifier 54 may transmit a value to regulator 52 that configures regulator 52 to output at least max ($V_{STRi}$) to ensure enough headroom for all current sources, SC converters 58A-58N, to deliver the correct string voltage $V_{STRi}$ for each LED string. Using a summing amplifier and a resistor divider is only one example technique to configure the output voltage for regulator 52.

SC converters 58A-58N operate in the same manner as SC converters 30A-30B in FIG. 1. Each LED string in system 50 may have a switched capacitor (SC) DC-to-DC converter. The SC converter for each string may deliver a respective LED string voltage $V_{STRi}$ to drive the respective LED string. The SC converter may deliver an LED string voltage, based at least in part on the number of active LEDs in an LED string for maximum efficiency, as described above for system 10.

In the example of system 52, controller 70 may set the number of active LEDs in each respective LED string and set the gain for the respective SC converter for the LED string. Controller 70 may receive inputs 60 from outside system 50 that may include which LEDs in a specific LED string should be active or inactive LEDs. Alternatively, controller 70 may determine which LEDs should be active LEDs based on internal logic or based on sensor inputs. For example, controller 70 may receive an input 60 from a light level sensor, such as a photocell or light dependent resistor (LDR), that the sun is near sunset. In response, controller 70 may activate one or more LED strings, such as headlights in an automobile.

Controller 70 may activate or deactivate LEDs in one or more LED strings by transmitting signals through switch bus 64. For example, controller 70 may determine that LEDs 68A and 68C should be active while 68B should be inactive. Here, controller 70 may cause LED bypass switches 66A and 66C to open, allowing current to flow through LEDs 68A and 68C while closing switch 66B, bypassing LED 68B. Controller 70 may cause transmit signals to the LED bypass switches through switch bus 64 to open or close the bypass switches.

In response to setting the active LEDs in each LED string, controller 70 may set the gain of each respective SC converter through SC gain selector 62. In the example of system 50, each LED has approximately the same forward voltage drop $V_{LED}$. Controller 70 may determine the gain of a respective SC controller for an LED string based on the number of active LEDs in the LED string. For example, in response to determining that LED string B should have twenty-seven active LEDs, controller 70 may determine the LED string voltage of LED string B should be $27*V_{LED}$. Controller 70 transmit a gain to SC converter 58B such that SC converter 58B delivers an LED string voltage of $27*V_{LED}$. Similarly, controller 70 may use SC gain selector 62 to transmit a respective gain to each respective SC converter in response to the number of active LEDs in each respective LED string in system 50. As an alternative, each respective SC converter may be configured to sense the LED string voltage, recognize the number of active LEDs and therefore choose the adequate gain factor without a gain input from controller 70.

Examples of controller 70 may include any one or more of a microprocessor, a controller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and that the integrated processing circuitry may be realized as fixed hardware processing circuitry, programmable processing circuitry and/or a combination of both fixed and programmable processing circuitry.

Figure 3:
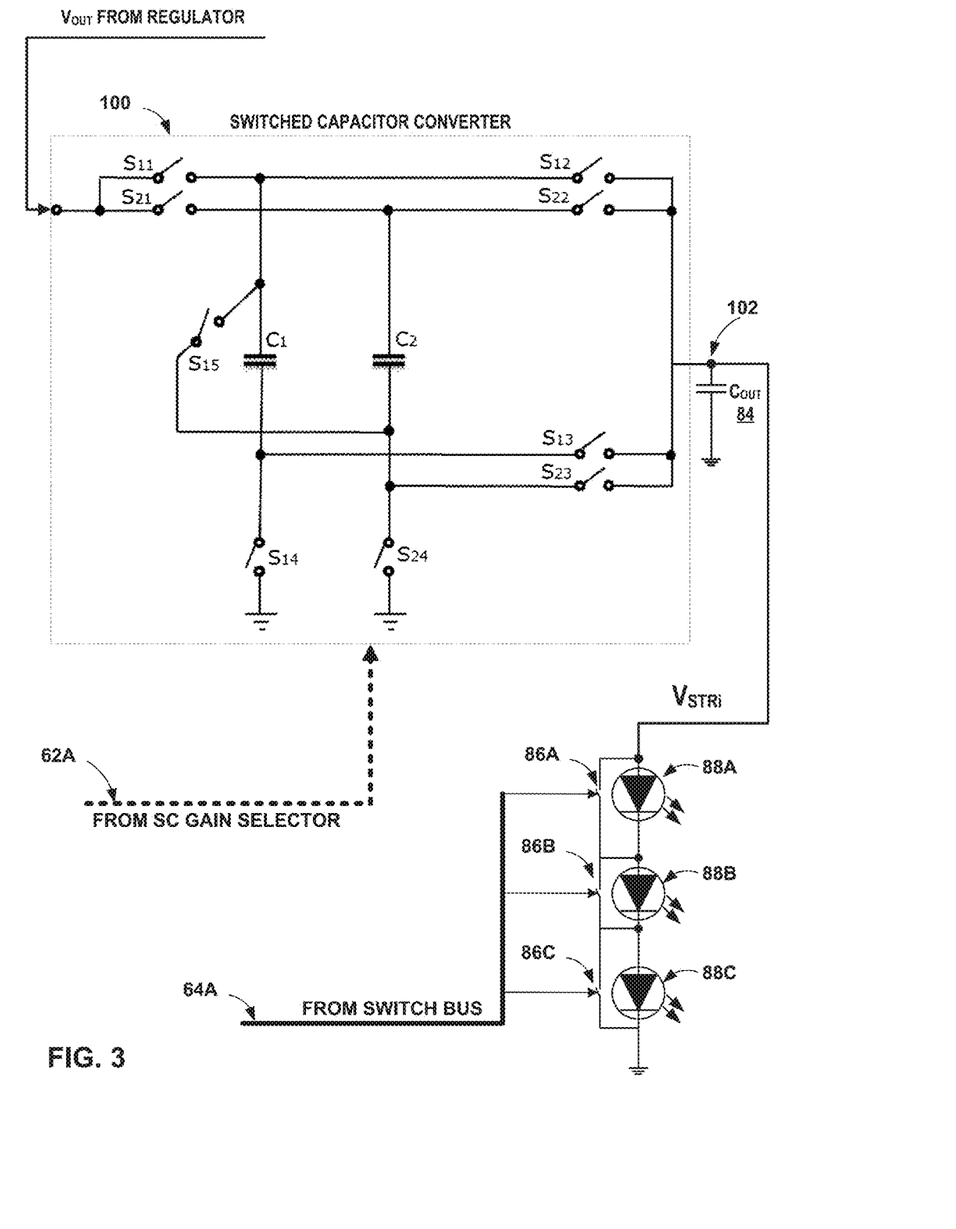
FIG. 3 is a conceptual and schematic diagram illustrating an example SC converter that may drive a maximum of three LEDs.

The example of system 50 in FIG. 2 is one possible implementation of an LED matrix driver system. Other configurations using a single voltage regulator to drive more than one LED string in which each LED string has an SC converter are within the scope of this disclosure. The configuration may depend on the number of LEDs in each LED string as well as the maximum string voltage for an LED matrix driver system. These factors may determine the type and capacity of voltage regulator 52 among other considerations. Configuring an LED matrix driver system to maximize efficiency, reduce cost and EMI impact and deliver the best performance depends on the configurations of the LED strings. FIGS. 3-4F illustrate an example of configuring an LED matrix driver system to maximize efficiency based on the configuration of the LED strings. These figures and description depict an example LED string with three LEDs and an SC converter with four gain level settings. FIG. 3 describes the structure while FIGS. 4A-4F describe details of the SC converter operation.

FIG. 3 is a conceptual and schematic diagram illustrating an example SC converter that may drive a maximum of three LEDs. FIG. 3 may depict a portion of an example LED matrix driver system with the SC converter configured as a buck converter for illustration and assumes $V_{OUT}$ from the regulator is ($V_{OUT}=V_{STRi}=3*V_{LED}$). For example, FIG. 3 is analogous to LED string 34 shown in FIG. 1 that includes three LEDs (34A-34C) and SC converter 30B. In other examples, the SC DC-to-DC converter of FIG. 3 may be configured as a boost converter or a buck-boost converter. For example, if the intermediate voltage from the regulated source $V_{OUT}$ is less than the LED string voltage $V_{STRi}$ needed for proper LED operation, SC converter may be configured as a boost converter.

SC converter 100 in FIG. 3 may be analogous to any of SC converters 30A-30B from FIG. 1 and SC converters 58A-58N from FIG. 2. SC converter 100 may receive intermediate voltage $V_{OUT}$ from a regulator, such as regulator 52 from FIG. 2 and may receive instructions from SC gain selector 62A. SC converter 100 may output an LED string voltage $V_{STRi}$ through output 102 to an associated LED string, which may include three LEDs 88A-88C, each controlled with bypass switches 86A-86C. Bypass switches 86A-86C may receive control inputs from switch bus 64A. Output capacitor 84 may connect output 102 to ground. Note that if $V_{OUT}>3*VLED$, then SC converter 100 may reduce the voltage. That is the voltage at 102 $Gi \times V_{in}$ where $Gi=1$; $\frac{2}{3}; \frac{1}{2}; \frac{1}{3}$ depending the switch configuration.

Example SC converter 100 may include nine switches and two capacitors C1 and C2, therefore SC converter 100 may realize four buck gain levels (1, $\frac{2}{3}$, $\frac{1}{2}$ and $\frac{1}{3}$). In other examples, SC converter 100 may include more switches and capacitors to realize additional gain levels or to configure SC converter 100 as a buck-boost converter. For example, a buck-boost SC converter example may realize up to 4N-5 different gain levels and require 6*N switches, where N is the number of capacitors, not including the output capacitor.

SC converter 100 may include capacitor C1 connected to ground through switch S14 and capacitor C2 connected to ground through switch 24. Switch S13 connects the node between C1 and S14 to output 102 while S23 connects the node between C2 and S24 to output 102. Switches S11 and S12 connect SC converter 100 input to output 102. Similarly Switches S21 and S22 connect SC converter 100 input to output 102 on a path separate from switches S11 and S12. The node between S11 and S12 connects to S14 through C1. Likewise the node between S21 and S22 connects to S24 through C2. Switch S15 connects the node between S21 and S22 to the node between C2 and S24.

SC converter output 102 connects to the anode of LED 88A. The three LEDs 88A-88C may connect in series to form an LED string with the cathode of 88A connecting to the anode of LED 88B, the cathode of 88B connecting to the anode of 88C and the cathode of 88C connecting to ground. Bypass switch 86A connects the anode and cathode of 88A. Likewise, bypass switches 88B and 88C connect the anode and cathode of LEDs 88B and 88C, respectively.

Figure 4A:
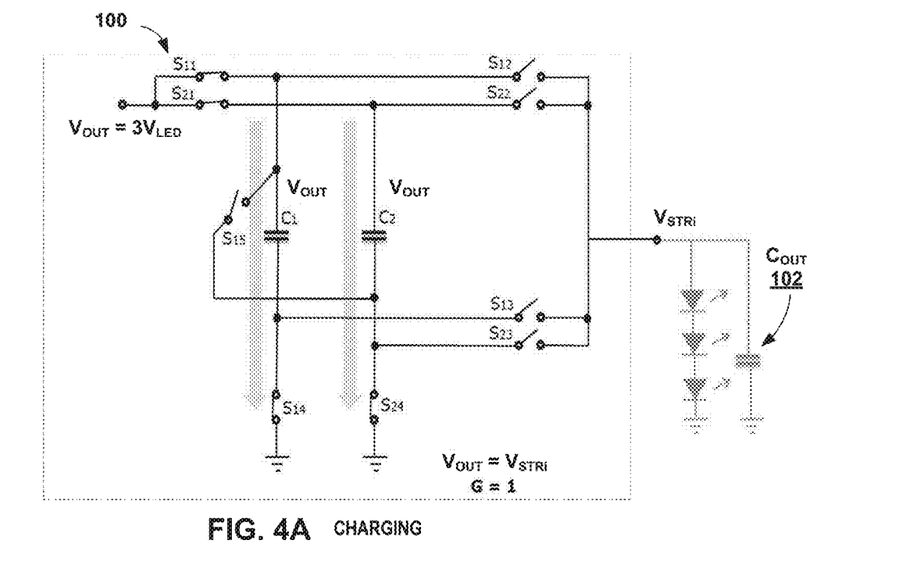
FIGS. 4A-4F are conceptual and schematic diagrams illustrating the operation of an example SC converter configured to realize multiple gains depending on the LED string configuration.
Figure 4B:
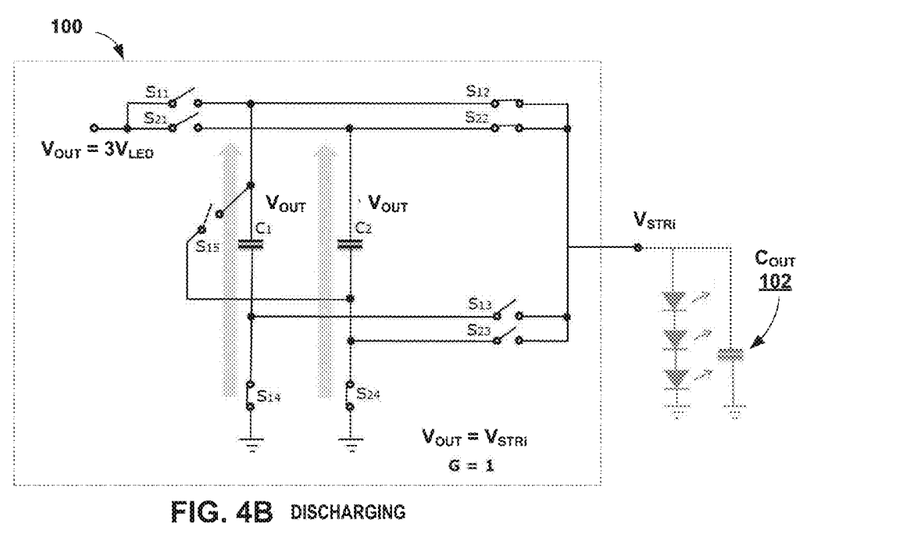

FIGS. 4A and 4B depict SC converter 100 configured to realize unity gain ($G_{100}=1$) and the intermediate voltage set to three times the LED forward voltage drop ($V_{OUT}=3*V_{LED}$). FIGS. 4A-4F include LEDs with approximately the same voltage drop of $V_{LED}$. The maximum voltage for the LED string, max($V_{STRi}$), occurs when all three LEDs are active LEDs. Therefore, for the example of FIGS. 4A-4F, max($V_{STRi}$)=$3*V_{LED}$. As discussed above for FIG. 1, an LED matrix driver system may reach efficiencies of 100% when the intermediate voltage $V_{OUT}$=max($V_{STRi}$). Also, as described above for FIG. 3, SC converter 100 is configured with two capacitors and nine switches to realize four gain levels (1, $\frac{2}{3}$, $\frac{1}{2}$, and $\frac{1}{3}$). In this way, the example of FIGS. 4A-4F illustrate a partial LED matrix driver system configured for maximum efficiency based on the configuration of the LED string.

FIG. 4A depicts the charging phase of SC converter 100. During the charging phase switches, when configured for unity gain ($G_{100}=1$), switches S11, S21, S14 and S24 close. Current flows from the regulator output, charging both capacitors C1 and C2 to the regulator output voltage ($V_{OUT}=3*V_{LED}$). During the discharge phase, shown in FIG. 4B, switches S11 and S21 open and switches S12 and S22 close sending current from capacitors C1 and C2 to the output of SC converter 100 at the same voltage as at the input ($V_{OUT}=3*V_{LED}$). This cycle repeats at the switching frequency set by the system.

Figure 4C:
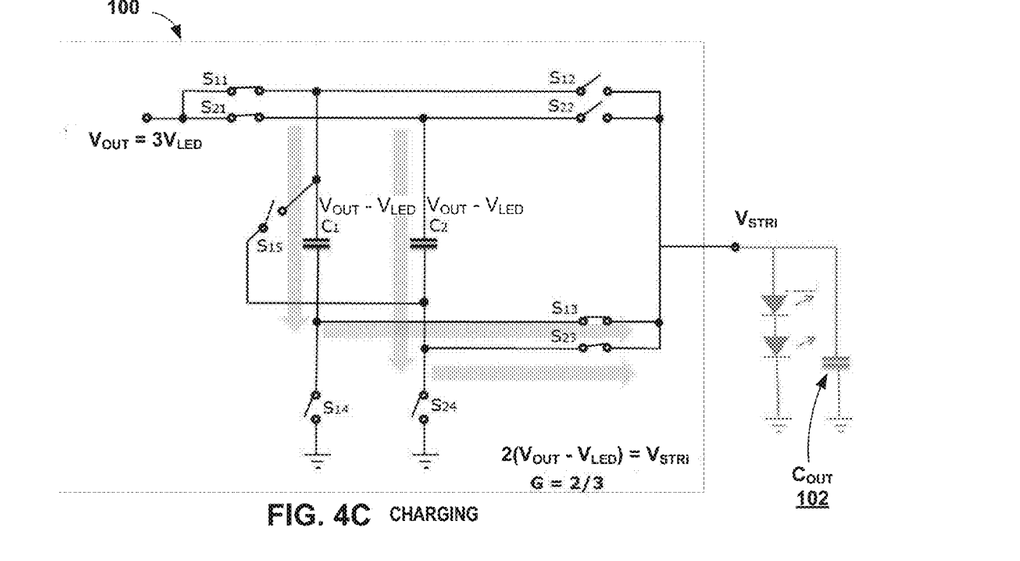
Figure 4D:
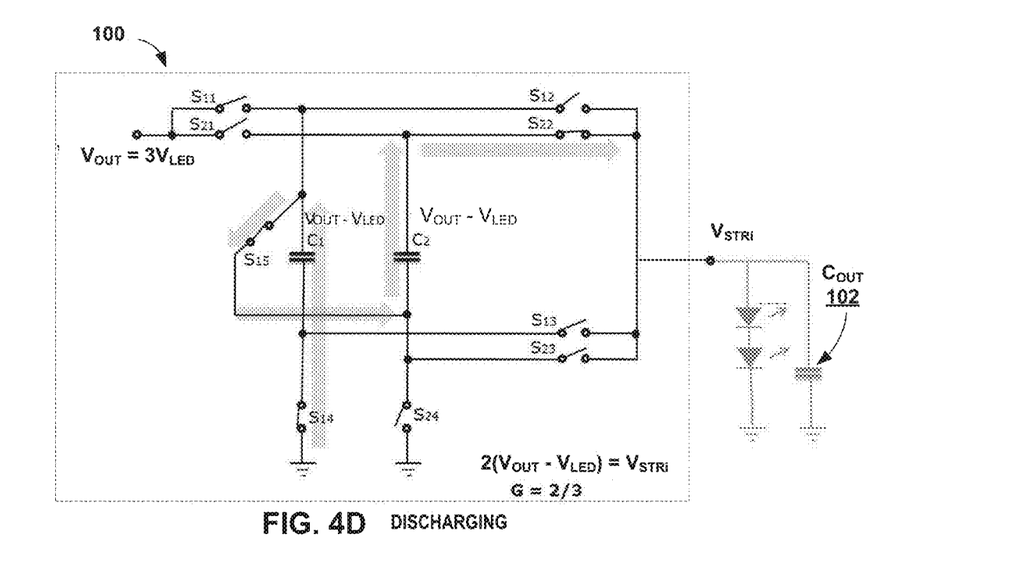

FIG. 4C depicts the charging phase of SC converter 100 when configured for ($G_{100}=2/3$). In FIG. 4C, SC converter delivers an LED string voltage to power two LEDs. For example, referring to FIG. 3, if switch 86A closes and bypasses LED 88A then only two LEDs (88B and 88C) remain as active LEDs. The maximum LED string voltage remains the same as for FIGS. 4A and 4B, so the regulator output remains the same $$V_{OUT}=\max(V_{STRi})=3*V_{LED}.$$

During the charging phase, switches S11, S21, S13 and S23 close charging both capacitors C1 and C2 to $V_{OUT}-V_{LED}=3*V_{LED}-V_{LED}=2*V_{LED}$. During the discharge phase, shown in FIG. 4D, switches S11, S21, S13 and S23 open while switches S14, S15 and S22 close. This cycle repeats at the switching frequency set by the system delivering an LED string voltage at the output of SC converter 100 of $V_{STRi}=2/3 V_{OUT}=2*V_{LED}$.

Figure 4E:
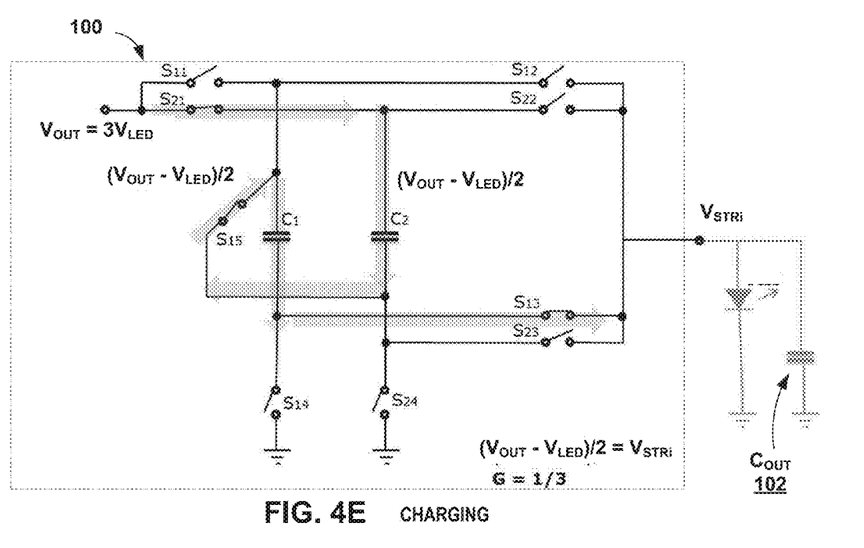
Figure 4F:
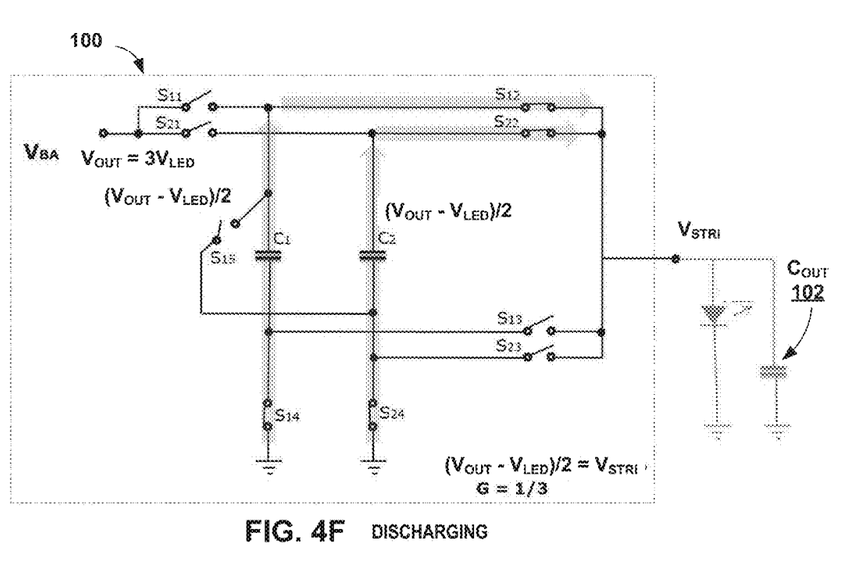

FIG. 4E depicts the charging phase of SC converter 100 when configured for ($G_{100}=1/3$). In FIG. 4E, SC converter delivers an LED string voltage to power a single LED. For example, referring to FIG. 3, if both switch 86A and 86C close, this bypasses LEDs 88A and 88C. Only LED 88B remains an active LED. The maximum LED string voltage remains the same as for FIGS. 4A-4D, so the regulator output remains $3*V_{LED}$. During the charging phase, switches S21, S15 and S13 close charging both capacitors C1 and C2 to $$(V_{OUT}-V_{LED})/2=(3*V_{LED}-V_{LED})=(2*V_{LED})/2=V_{LED}.$$

During the discharge phase, shown in FIG. 4F, switches S21, S15 and S13 open while switches S12, S14, S24 and S22 close. This cycle repeats at the switching frequency set by the system delivering an LED string voltage at the output of SC converter 100 of $$V_{STRi}=1/3 V_{OUT}=V_{LED}.$$

FIGS. 4A-4F illustrate an example of how a multi-gain SC DC-to-DC converter may convert an intermediate voltage from a single regulator to deliver an LED string voltage that matches the voltage needed to properly operate the LED string. In this example, the LED voltage drop for each LED in the LED string is equal to the voltage drop of all LEDs in the LED string. The combination of setting the voltage regulator output to the maximum LED string voltage and selecting a multi-gain SC converter with gain settings that divide the regulator output voltage to an LED string voltage that properly operates the active LEDs in the LED string is an example of configuring an LED matrix driver system to maximize efficiency based on the configuration of the LED strings. The closer the regulator output voltage is to a multiple of the LED voltage drop $N*V_{LED}$, combined with gain settings for the SC converters that allow the LED string voltage $V_{STRi}$ for each respective LED string to closely match the number of active LEDs, the better the system efficiency.

Figure 5:
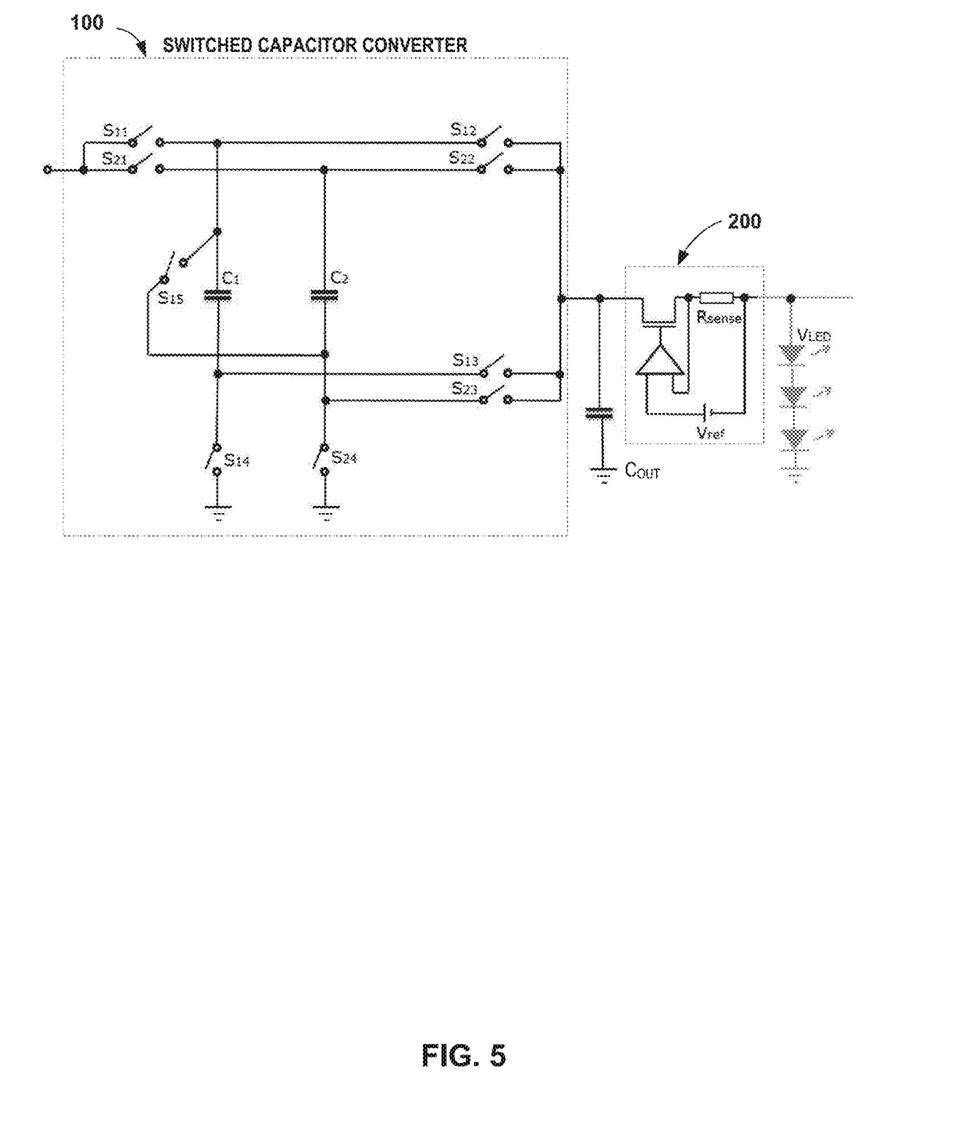
FIG. 5 depicts an example LED string with a SC converter and an additional current regulator.

FIG. 5 depicts an example LED string with a SC converter and an additional current regulator. FIG. 5 is identical to the circuit shown in FIG. 3 with the addition of an example, low voltage drop current regulator. The example of FIG. 5 may be desirable in cases where the current through the LED string may have to be very accurate and filtered.

FIG. 5 depicts SC converter 100 with the output connected to an LED string through an example low voltage drop current regulator 200. $C_{OUT}$ connects the SC converter output to ground. Example current regulator 200 may include a transistor with the transistor gate controlled by a differential amplifier. The differential amplifier inputs may connect to a voltage reference and across a sense resistor. The sense resistor may be arranged so the output current from SC converter flows through the sense resistor and further to the LED string. Example linear low drop current regulator 200 may filter out spikes in current or voltage and impose a precise current through the LED string.

In the example of FIG. 5, the input voltage to SC converter 100 may be higher than LED string voltage required for proper LED string operation because there may be some voltage drop across the low drop current regulator ($V_{DROP}$). For example, an LED string with N LEDs and all the LEDs with the same voltage drop $V_{LED}$, the intermediate voltage delivered by the voltage regulator, such as voltage regulator 52 shown in FIG. 2, to the SC converter input may be set to $(N+1)*V_{LED}$. In another example the intermediate voltage ($V_{OUT}$) may be set to $N*Vled+V_{DROP}$, where $V_{DROP}$ is the voltage drop across the LDO (Low dropout current regulator).

As described above in FIG. 1, example LED matrix driver systems may set an intermediate voltage output from regulator 20 according to the equation $$V_{OUT}=\max(V_{STRi})+k*V_{LED}.$$

Examples of LED matrix driver systems with one or more LED strings that require a regulated output configured to filter out voltage spikes and impose precision control on the LED string electrical current may set the value of k so that k≥0.

Figure 6:
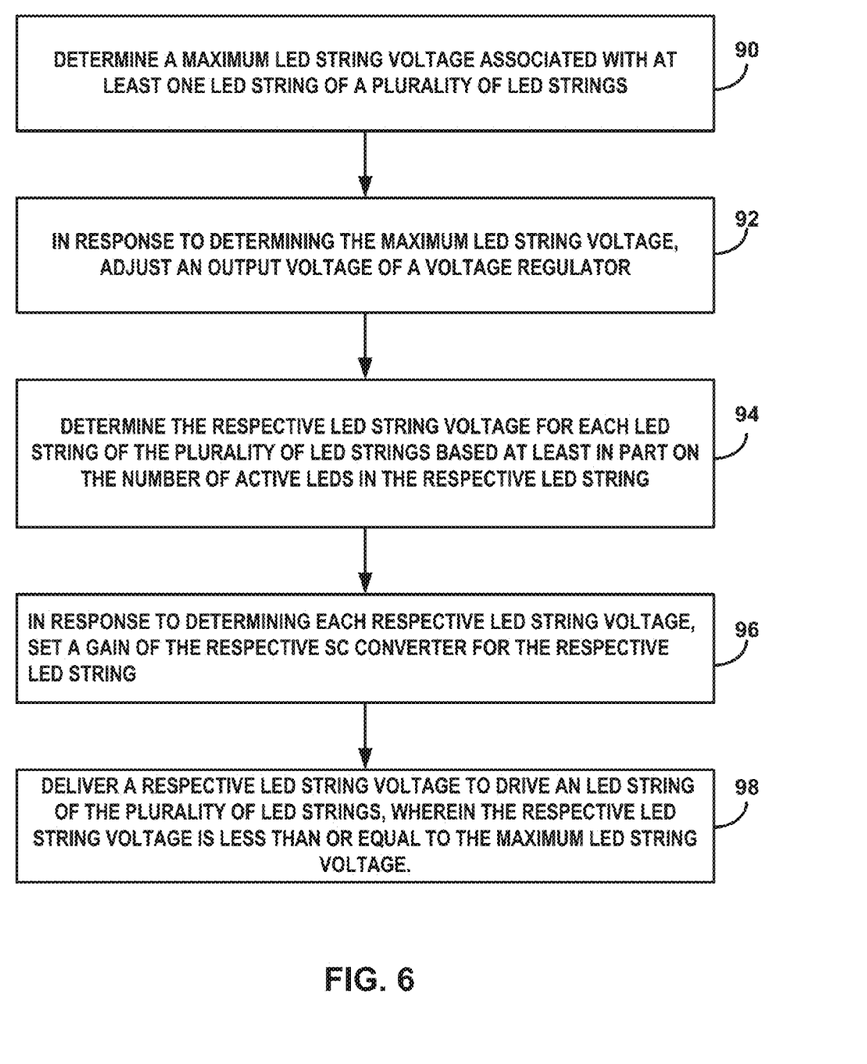
FIG. 6 is a flowchart illustrating an example technique to drive multiple LED strings with different LED string voltage drops from a single regulated source.

FIG. 6 is a flowchart illustrating an example technique to drive multiple LED strings with different LED string voltage drops from a single regulated source. The description of FIG. 6 below will be in the context of FIG. 2.

Controller 70 of system 50 may determine a maximum LED string voltage associated with at least one LED string of a plurality of LED strings (90). In one example, controller 70 may set the bypass switches through switch bus 64 and determine which LED string of the multiple LED strings 58A-58N has the highest number of active LEDs. Where all LED voltage drops $V_{LED}$ are approximately the same throughout system 10, the LED string with the highest number of active LEDs may be the string with the maximum LED string voltage drop.

In response to determining the maximum LED string voltage max($V_{STRi}$), adjust an output voltage $V_{OUT}$ of a voltage regulator 52 (92) according to the equation $$V_{OUT}=\max(V_{STRi})+k*V_{LED}.$$

In some examples, the value of k may be zero. In some examples controller 70 may adjust the output voltage of regulator 52 where in other examples an external controller may adjust the voltage. Regulator 52 may also have an input port to communicate with controller 70, or other component and regulator 52 may internally set the output voltage. System 50 may achieve an efficiency of approximately 100% where $V_{OUT}$ is a multiple of the number of LEDs in the LED string with the maximum LED string voltage.

Controller 70 may determine the respective LED string voltage for each LED string of the plurality of LED strings 58A-58N based at least in part on the number of active LEDs in the respective LED string (94). In the example of system 50, controller 70 may determine the number of LEDs by determining the number of open or closed bypass switches, such as switches 66A-66N. For example, controller 70 may determine the LED string voltage for LED string A is forty-one by determining there are forty-one open bypass switches in LED string A. Controller 70 may determine the LED string voltage for LED string A is: $V_{STRA}=41*V_{LED}$. Controller 70 may determine each respective LED string voltage for the other LED strings in system 50 in a similar manner.

In response to determining each respective LED string voltage $V_{STRi}$, set a gain of the respective SC converter 58A-58N for the respective LED string A-N (96). As described above, each SC converter in system 50 may achieve an efficiency of near 100% when the LED string voltage $V_{STRi}$ is a multiple of the intermediate voltage $V_{OUT}$. That is when $V_{STRi}=Gi*V_{OUT}$. Controller 70 may select a respective gain Gi for each SC converter so that each SC converter delivers the proper string voltage $V_{STRi}$. Controller 70 may set each respective gain through SC gain selector 62.

Each respective SC converter may deliver a respective LED string voltage $V_{STRi}$ to drive an LED string of the plurality of LED strings, wherein the respective LED string voltage is less than or equal to the maximum LED string voltage (98). In the example of system 50, each SC converter 58A-58N may be a buck converter because the output $V_{OUT}$ of voltage regulator 52 may be set to at least the maximum string voltage max($V_{STRi}$). Therefore each LED string voltage may be equal to $V_{OUT}$ (i.e. unity gain, Gi=1) for an LED string with the maximum string voltage. Other LED string voltages may be less than the maximum, therefore the SC converter for may realize a gain less than 1 (Gi<1). In this way, an LED matrix driver system may efficiently drive multiple LED strings from a single regulated source. A system that uses a switched capacitor DC-to-DC converter between the regulated source and the LED string may have advantages of low cost and small size. An SC converter configured so the gain is a multiple of the number of LEDs in an LED string may also have an advantage of reduced complexity.

Example 1 a method comprising determining, by a light-emitting diode (LED) matrix driver system, a maximum LED string voltage associated with at least one LED string of a plurality of LED strings; and in response to determining the maximum LED string voltage, adjusting, by the LED matrix driver system, an output voltage of a regulator output, wherein: the regulator output couples to a plurality of input terminals of a plurality of switched capacitor (SC) converters, and a respective SC converter of the plurality of SC converters delivers a respective LED string voltage to drive an LED string of the plurality of LED strings, wherein the respective LED string voltage is less than or equal to the maximum LED string voltage.

Example 2

The method of claim 1, wherein determining the maximum LED string voltage includes determining a number of active LEDs in each respective LED string of the plurality of LED strings.

Example 3

The method of any of examples 1-2, further comprising: in response to determining the number of active LEDs in a respective LED string, setting, by the LED matrix driver system, a gain of the respective SC converter for the respective LED string based at least in part on the number of active LEDs in the respective LED string.

Example 4

The method of any of examples 1-3, wherein: each respective LED string of the plurality of LED strings comprises a plurality of LEDs, an LED voltage drop (VLED) for an LED of the plurality of LEDs in the respective LED string is approximately equal to the LED voltage drop of all LEDs of the plurality of LEDs in the LED string, and the respective LED string voltage of the respective LED string is approximately equal to the LED voltage drop (VLED) multiplied by the number of active LEDs in each respective LED string of the plurality of LED strings.

Example 5

The method of any of examples 1-4, wherein setting a gain of the respective SC converter comprises calculating the gain according to an equation: Gi=n/((k+m)), wherein: Gi is the gain of the respective SC converter, n is the number of active LEDs in the respective LED string, k is an additional voltage factor, and m is the maximum number of active LEDs in an LED string of the plurality of LED strings.

Example 6

A system comprising: a plurality of LED strings, wherein each LED string in the plurality of LED strings includes a plurality of LEDs, and one of the plurality of LED strings defines a maximum LED string voltage; a plural of switched capacitor (SC) converters, wherein each respective SC converter of the plurality of SC converters includes an input terminal and an output terminal, and wherein the output terminal of a respective SC converter couples to a respective LED string of the plurality of LED strings and provides a respective LED string voltage to drive each respective LED string; and a voltage regulator, wherein a voltage regulator output couples to each input terminal of the plurality of SC converters, and the system adjusts an output voltage of the voltage regulator based at least in part on the maximum LED string voltage.

Example 7

The system of example 6, wherein the system is configured to determine a number of active LEDs in each respective LED string of the plurality of LED strings and in response to determining the number of active LEDs in a respective LED string, set a gain of the respective SC converter for the respective LED string based at least in part on the number of active LEDs in the respective LED string.

Example 8

The system of any of examples 6-7, further comprising a controller configured to: select a number of LEDs in each respective LED string of the plurality of LED strings to be active LEDs; in response to selecting the number of active LEDs in a respective LED string, set the gain of the respective SC converter for the respective LED string based at least in part on the number of active LEDs in the respective LED string.

Example 9

The system of any of examples 6-8, wherein for at least one LED string of the plurality of LED strings: an LED voltage drop (VLED) for an LED of the plurality of LEDs is approximately equal to the LED voltage drop of all LEDs of the plurality of LEDs included in the at least one LED string, and the respective LED string voltage of at least one respective LED string is approximately equal to the LED voltage drop (VLED) multiplied by a number of active LEDs in the at least one LED string of the plurality of LED strings.

Example 10

The system of any of examples 6-9, wherein the system is further configured to set a gain of each respective SC converter associated with the at least one LED string according to an equation $Gi=n/((k+m))$, wherein: $Gi$ is the gain of the respective SC converter associated with the at least one LED string, n is the number of active LEDs in the at least one LED string, k is an additional voltage factor, and m is the maximum number of active LEDs in the LED string of the plurality of LED strings that defines a maximum LED string voltage.

Example 11

The system of any of examples 6-10, wherein at least one SC converter comprises a regulated output configured to filter out voltage spikes and impose precision control on an electrical current for an LED string of the plurality of LED strings associated with the at least one SC converter.

Example 12

The system of any of examples 6-11, wherein one or more of the SC converters is configured as a buck converter.

Example 13

The system of any of examples 6-12, wherein at least a portion of the system comprises an integrated circuit.

Example 14

A device comprising: a plurality of LED strings, wherein each LED string in the plurality of LED strings includes a plurality of LEDs, and one of the plurality of LED strings defines a maximum LED string voltage a plurality of switched capacitor (SC) converters, wherein each respective SC converter of the plurality of SC converters includes an input terminal and an output terminal, and wherein the output terminal of a respective SC converter couples to a respective LED string of the plurality of LED strings and provides a respective LED string voltage to drive each respective LED string; and a voltage regulator, wherein a voltage regulator output couples to each input terminal of the plurality of SC converters, and the system adjusts an output voltage of the voltage regulator based at least in part on the maximum LED string voltage.

Example 15

The device of example 14, wherein the device is configured to determine a number of active LEDs in each respective LED string of the plurality of LED strings and in response to determining the number of active LEDs in a respective LED string, set a gain of the respective SC converter for the respective LED string based at least in part on the number of active LEDs in the respective LED string.

Example 16

The device of any of examples 14-15, further comprising a controller configured to: select a number of LEDs in a respective LED string of the plurality of LED strings is to be active LEDs; in response to selecting the number of active LEDs in a respective LED string, set the gain of the respective SC converter for the respective LED string based at least in part on the number of active LEDs in the respective LED string.

Example 17

The device of any of examples 14-16, wherein for at least one LED string of the plurality of LED strings: an LED voltage drop (VLED) for an LED of the plurality of LEDs is approximately equal to the LED voltage drop of all LEDs of the plurality of LEDs included in the at least one LED string, the respective LED string voltage of the at least one LED string is approximately equal to the LED voltage drop multiplied by a number of active LEDs in the at least one LED string.

Example 18

The device of any of examples 14-17, wherein the device is further configured to set a gain of each respective SC converter associated with the at least one LED string according to an equation $Gi=n/((k+m))$, wherein: $Gi$ is the gain of the respective SC converter associated with the at least one LED string, n is the number of active LEDs in the at least one LED string, k is an additional voltage factor, m is the maximum number of LEDs in an LED string of the plurality of LED strings that defines a maximum LED string voltage.

Example 19

The device of any of examples 14-18 wherein each respective SC converter may be configured to sense the number of active LEDs and set a gain of the respective SC converter for the respective LED string based at least in part on the number of active LEDs in the respective LED string.

Example 20

The device of any of claims 14-19, wherein one or more of the SC converters is configured as a buck converter.

Various embodiments of the disclosure have been described. These and other embodiments are within the scope of the following claims.

The invention claimed is:

1. A method comprising:
   determining, by a light-emitting diode (LED) matrix driver system, a maximum LED string voltage associated with at least one LED string of a plurality of LED strings; and
   in response to determining the maximum LED string voltage, adjusting, by the LED matrix driver system, an output voltage of a regulator output, wherein:
      the regulator output couples to a plurality of input terminals of a plurality of switched capacitor (SC) converters, and
      a respective SC converter of the plurality of SC converters delivers a respective LED string voltage to drive an LED string of the plurality of LED strings, wherein the respective LED string voltage is less than or equal to the maximum LED string voltage.

2. The method of claim 1, wherein determining the maximum LED string voltage includes determining a number of active LEDs in each respective LED string of the plurality of LED strings.

3. The method of claim 2, further comprising:
   in response to determining the number of active LEDs in a respective LED string, setting, by the LED matrix driver system, a gain of the respective SC converter for the respective LED string based at least in part on the number of active LEDs in the respective LED string.

4. The method of claim 2, wherein:
   each respective LED string of the plurality of LED strings comprises a plurality of LEDs,
   an LED voltage drop ($V_{LED}$) for an LED of the plurality of LEDs in the respective LED string is approximately equal to the LED voltage drop of all LEDs of the plurality of LEDs in the LED string, and
   the respective LED string voltage of the respective LED string is approximately equal to the LED voltage drop ($V_{LED}$) multiplied by the number of active LEDs in each respective LED string of the plurality of LED strings.

5. The method of claim 4, wherein setting a gain of the respective SC converter comprises calculating the gain according to an equation $$Gi = \frac{n}{(k+m)},$$

wherein:
   Gi is the gain of the respective SC converter,
   n is the number of active LEDs in the respective LED string,
   k is an additional voltage factor, and
   m is the maximum number of active LEDs in an LED string of the plurality of LED strings.

6. A system comprising:
   a plurality of LED strings, wherein each LED string in the plurality of LED strings includes a plurality of LEDs, and one of the plurality of LED strings defines a maximum LED string voltage;
   a plurality of switched capacitor (SC) converters, wherein each respective SC converter of the plurality of SC converters includes an input terminal and an output terminal, and wherein the output terminal of a respective SC converter couples to a respective LED string of the plurality of LED strings and provides a respective LED string voltage to drive each respective LED string; and
   a voltage regulator, wherein a voltage regulator output couples to each input terminal of the plurality of SC converters, and the system adjusts an output voltage of the voltage regulator based at least in part on the maximum LED string voltage.

7. The system of claim 6, wherein the system is configured to determine a number of active LEDs in each respective LED string of the plurality of LED strings and in response to determining the number of active LEDs in a respective LED string, set a gain of the respective SC converter for the respective LED string based at least in part on the number of active LEDs in the respective LED string.

8. The system of claim 6, further comprising a controller configured to:
   select a number of LEDs in each respective LED string of the plurality of LED strings to be active LEDs;
   in response to selecting the number of active LEDs in a respective LED string, set the gain of the respective SC converter for the respective LED string based at least in part on the number of active LEDs in the respective LED string.

9. The system of claim 6, wherein for at least one LED string of the plurality of LED strings:
   an LED voltage drop ($V_{LED}$) for an LED of the plurality of LEDs is approximately equal to the LED voltage drop of all LEDs of the plurality of LEDs included in the at least one LED string, and
   the respective LED string voltage of at least one respective LED string is approximately equal to the LED voltage drop ($V_{LED}$) multiplied by a number of active LEDs in the at least one LED string of the plurality of LED strings.

10. The system of claim 9, wherein the system is further configured to set a gain of each respective SC converter associated with the at least one LED string according to an equation $$Gi = \frac{n}{(k+m)},$$

wherein:
   Gi is the gain of the respective SC converter associated with the at least one LED string,
   n is the number of active LEDs in the at least one LED string,
   k is an additional voltage factor, and
   m is the maximum number of active LEDs in the LED string of the plurality of LED strings that defines a maximum LED string voltage.

11. The system of claim 6, wherein at least one SC converter comprises a regulated output configured to filter out voltage spikes and impose precision control on an electrical current for an LED string of the plurality of LED strings associated with the at least one SC converter.

12. The system of claim 6, wherein one or more of the SC converters is configured as a buck converter.

13. The system of claim 6, wherein at least a portion of the system comprises an integrated circuit.

14. A device comprising:
   a plurality of LED strings, wherein each LED string in the plurality of LED strings includes a plurality of LEDs, and one of the plurality of LED strings defines a maximum LED string voltage;

a plurality of switched capacitor (SC) converters, wherein each respective SC converter of the plurality of SC converters includes an input terminal and an output terminal, and wherein the output terminal of a respective SC converter couples to a respective LED string of the plurality of LED strings and provides a respective LED string voltage to drive each respective LED string; and a voltage regulator, wherein a voltage regulator output couples to each input terminal of the plurality of SC converters, and the device adjusts an output voltage of the voltage regulator based at least in part on the maximum LED string voltage.

15. The device of claim 14, wherein the device is configured to determine a number of active LEDs in each respective LED string of the plurality of LED strings and in response to determining the number of active LEDs in a respective LED string, set a gain of the respective SC converter for the respective LED string based at least in part on the number of active LEDs in the respective LED string.

16. The device of claim 14, further comprising a controller configured to:
   select a number of LEDs in a respective LED string of the plurality of LED strings is to be active LEDs;
   in response to selecting the number of active LEDs in a respective LED string, set the gain of the respective SC converter for the respective LED string based at least in part on the number of active LEDs in the respective LED string.

17. The device of claim 14, wherein for at least one LED string of the plurality of LED strings:

an LED voltage drop ($V_{LED}$) for an LED of the plurality of LEDs is approximately equal to the LED voltage drop of all LEDs of the plurality of LEDs included in the at least one LED string, the respective LED string voltage of the at least one LED string is approximately equal to the LED voltage drop multiplied by a number of active LEDs in the at least one LED string.

18. The device of claim 17, wherein the device is further configured to set a gain of each respective SC converter associated with the at least one LED string according to an equation $$Gi = \frac{n}{(k+m)},$$

wherein:
   Gi is the gain of the respective SC converter associated with the at least one LED string,
   n is the number of active LEDs in the at least one LED string,
   k is an additional voltage factor,
   m is the maximum number of LEDs in an LED string of the plurality of LED strings that defines a maximum LED string voltage.

19. The device of claim 14 wherein each respective SC converter may be configured to sense the number of active LEDs and set a gain of the respective SC converter for the respective LED string based at least in part on the number of active LEDs in the respective LED string.

20. The device of claim 14, wherein one or more of the SC converters is configured as a buck converter.

* * * * *